United States Patent [19]
Carugati et al.

[11] Patent Number: 5,788,724
[45] Date of Patent: Aug. 4, 1998

[54] PROCESS FOR THE CONVERSION OF HYDROCARBON MATERIALS HAVING A HIGH MOLECULAR WEIGHT

[75] Inventors: Angelo Carugati, Lomazzo; Lorenzo Ippolito De Vita, Milan; Paolo Pollesel, Cesano Boscone, all of Italy

[73] Assignee: Eniricerche S.p.A., Milan, Italy

[21] Appl. No.: 646,146

[22] Filed: May 7, 1996

[30] Foreign Application Priority Data

Jun. 1, 1995 [IT] Italy ................... MI95A1137

[51] Int. Cl.⁶ ..................... C10G 11/02; C10K 3/06; C10J 3/57
[52] U.S. Cl. ..................... 48/197 R; 48/211; 48/DIG. 1; 208/52 R; 208/85; 208/121
[58] Field of Search ................... 48/197 R, 211, 48/DIG. 1; 208/52 R, 121, 85

[56] References Cited

U.S. PATENT DOCUMENTS

| | | | |
|---|---|---|---|
| 3,915,844 | 10/1975 | Ueda et al. | 48/211 |
| 4,289,603 | 9/1981 | DeGeorge | 48/197 R |
| 5,626,638 | 5/1997 | Valkanas | 48/197 R |

FOREIGN PATENT DOCUMENTS

| | | |
|---|---|---|
| 1 123 774 | 5/1982 | Canada . |
| 0 344 376 | 12/1989 | European Pat. Off. . |
| 302 397 | 1/1914 | Germany . |

*Primary Examiner*—Tae Yoon
*Attorney, Agent, or Firm*—Oblon, Spivak, McClelland, Maier & Neustadt, P.C.

[57] ABSTRACT

Process for the conversion of a hydrocarbon material having a high molecular weight, in particular petroleum residues or heavy crude oils or reduced crude oils, comprising the following steps:

impregnating or mixing the hydrocarbon material with a catalyst;

pyrolyzing the impregnated residue in a suitable zone at a temperature of between 450° and 650° C. and at a pressure of less than 25 Atms, obtaining a gaseous stream containing hydrocarbons and a solid stream;

gasifying the solid stream leaving the pyrolysis step in a single step with water vapour and in the presence of air in a ratio of between 10 and 100% and between 10 and 60% by weight respectively with the charge fed to the gasification section;

condensing and separating the hydrocarbons contained in the gaseous stream obtained in the pyrolysis step obtaining one liquid stream and one gas stream;

mixing the latter gas stream with the gaseous stream obtained in the gasification step and feeding the stream thus obtained to a plant for the production of thermal or electric energy.

10 Claims, 1 Drawing Sheet

PROCESS FOR THE CONVERSION OF HYDROCARBON MATERIALS HAVING A HIGH MOLECULAR WEIGHT

FIELD OF THE INVENTION

The present invention relates to a process for the complete conversion of hydrocarbon materials with a high molecular weight (in particular petroleum residues or heavy crude oils) into more valuable products with a low molecular weight and fuel gas, by two integrated steps of pyrolysis in continuous and gasification.

BACKGROUND OF THE INVENTION

The best possible use of petroleum residues and heavy crude oils represents a technological problem which is at present approached in three ways.

The first approach involves the total transformation of the charge into gas with medium heating power, under pressure (>40 bars), used in a combined cycle (IGCC) for the production of electric energy. In this sphere, the gasification in a bed dragged with oxygen is technologically mature, the market is subdivided between Texaco and Lurgi (with Shell technology). These processes have numerous commercial applications on different fuels and should, at least theoretically, offer high reliability, good flexibility and low environmental impact. The gas, purified of pollutants, has a lower heating power of about 2500–2900 kcal/Nmc which can be fed to the gas turbine of a combined cycle with limited adjustments.

The greatest limitation in the application of this technology lies in the high specific investments; in addition, the energetic efficiency of the drag-bed gasifiers is, on a thermodynamic basis, lower than that of other gasifiers (fluid or fixed bed).

The second approach relates to a process, already longstanding, which involves the coking of the charge, together with gasification with air: Flexicoking (Exxon), a development of Fluidcoking.

In this case, distillates are produced together with a gas having a pressure close to atmospheric pressure with a lower heating power of about 1000–1200 kcal/Nmc, which can be fed after compression to the gas turbine of a combined cycle with greater difficulties with respect to the Texaco case.

The great complexity of the scheme which involves the integrated functioning of three fluid-bed reactors (one for the pyrolysis, one for the gasification, one for the combustion of part of the coke to supply the process heat) has in fact prevented its use outside the Exxon refineries.

In the third approach, which moves towards processes without a gasification step, the L–R Coker (Lurgi) technology is a reference example for pyrolysis in continuous of heavy products of a petroleum nature. The heat necessary for the pyrolysis is supplied by the combustion of part of the coke, with recirculation of the hot solid to the pyrolizer. The advantages claimed are flexibility in relation to the charges, with no hindrances due to agglomeration, and the higher production of liquids with respect to the other coking technologies.

The process produces distillates in significant amounts together with a reasonable quantity of coke (30–50% by weight of the initial charge).

SUMMARY OF INVENTION

We have now found that by operating with a scheme similar to that of L-R Coke but with a catalytic gasification step with air instead of combustion, it is possible to obtain, in addition to a considerable production of distillates, a fuel gas which can be used in a power cycle, without obtaining coke as a by-product. The use of the catalyst in the gasification, with the same charge, results in a substantial lowering of the gasification temperature and consequently:

on the whole lower consumptions of oxidant;
higher heating power of the gases produced;
high thermal efficiency.

The use of the scheme we propose enables better results to be obtained compared to the Flexicoking scheme together with a minor complexity of the plant.

If the gasification is carried out under pressure, it is also possible to feed a system for the production of electric energy with a high efficiency (combined cycle) with a consumption of energy for the compression of the fuel gas which is definitely lower than that of the Flexicoking scheme, functioning at pressures close to atmospheric pressure.

The process of the present invention for the complete conversion of hydrocarbon materials with a high molecular weight is characterized in that it comprises the following steps:

impregnation or mixing of the hydrocarbon material with a high molecular weight with a catalyst basically consisting of one or more alkaline and/or earth-alkaline compounds wherein the alkaline or earth-alkaline ion or ions are in a quantity of between 1 and 20% by weight with respect to the hydrocarbon material;

pyrolysis of the impregnated residue in a suitable zone at a temperature of between 450° and 650° C., preferably between 450° and 550° C., at a pressure of less than 25 Atms, preferably between 1 and 1.5 Atms, obtaining a gaseous stream containing hydrocarbons and a solid stream basically consisting of coke impregnated with catalyst;

gasification of the solid stream leaving the pyrolysis step in a single step with water vapour and in the presence of air in a ratio of between 10 and 100% and between 10 and 60% by weight respectively with the charge fed to the gasification section, operating at a temperature of between 600° and 850° C., preferably between 600° and 700° C., and at a pressure of between 1 and 25 Atms, preferably between 20 and 25 Atms, to generate a gaseous stream basically consisting of a fuel gas with a low/medium heating power and a solid stream to be recycled, at least in part, preferably at least 70% by weight, to the pyrolysis step;

condensation and separation of the hydrocarbons contained in the gaseous stream obtained in the pyrolysis step obtaining one liquid stream and one gas stream;

mixing the latter gas stream with the gaseous stream obtained in the gasification step and feeding the stream thus obtained to a plant for the production of thermal or electric energy.

The hydrocarbon materials with a high molecular weight, which can be used, are petroleum residues, in particular those obtained from a deasphaltation process of a petroleum distillation residue or from a visbreaking process, heavy crude oils and reduced crude oils.

In the gasification step it is preferable for the air ratio of the charge to be between 20 and 60% by weight and for the vapour ratio of the charge to be between 20 and 60% by weight.

In addition in the gasification step it is preferable for the temperature of the gases discharged to be less than 600° C.

BRIEF DESCRIPTION OF THE DRAWING

The drawing is a diagrammatic representation of the process for the conversion of a hydrocarbon material.

DETAILED DESCRIPTION

Figure 1:
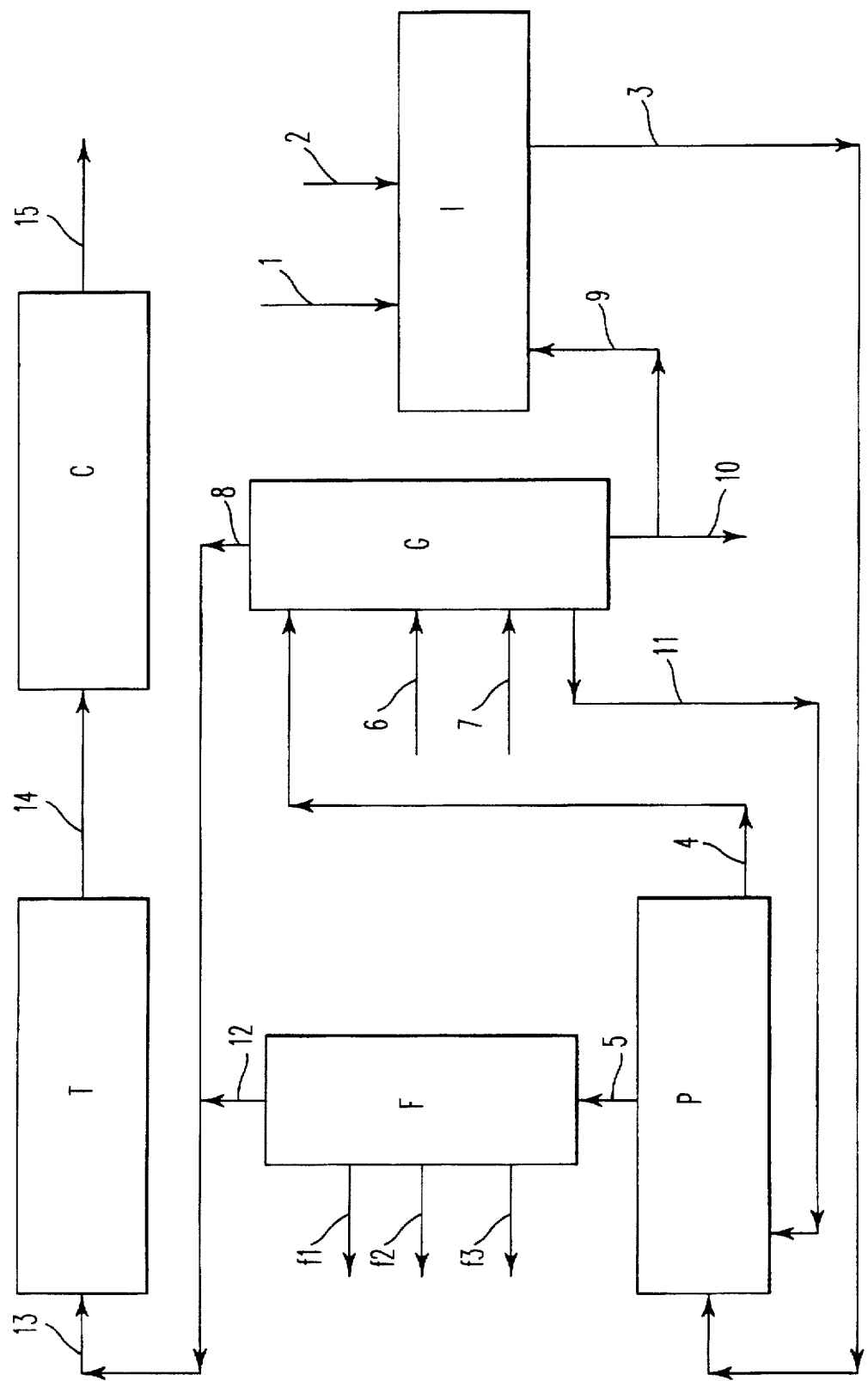

A preferred embodiment of the present invention is provided with the help of the enclosed figure which however does not limit the scope of the present invention.

The hydrocarbon material (1) is impregnated (or mixed) with the catalyst (2) in the impregnation (or mixing) step (I) and the product thus obtained (3) is sent to the pyrolizer (P) from which two streams, one solid (4) and one gaseous (5) are obtained.

The solid stream (4) basically consisting of coke impregnated with the catalyst is fed to the gasifier (G) into which air (6) and water vapour (7) are introduced.

A gaseous stream (8) leaves the top of the gasifier (G), whereas the residues (9) basically containing ash, char and the catalyst, unless an optional flushing (10), are recycled from the bottom to the impregnation (or mixing) step (I). A solid stream (11), basically consisting of char, ash and catalyst, which must be at a higher temperature and lower mass flow rate than the stream (4), is removed from the gasifier (G) and is recycled to the pyrolizer (P). The gaseous stream (5) leaving the pyrolizer (P) is fed to a fractionator (F) in which the higher-boiling hydrocarbon components (for example higher than $C_5$) are separated in liquid form ($f_1$, $f_2$, $f_n$) whereas the non-condensed fractions form the stream (12) which, after being mixed with stream (8), forms in turn the stream (13) which is optionally treated in (T) to remove at least part of the acid gases and then used (14), for example, to feed a combined cycle (C) for the production of electric energy (15).

The following example provides a better illustration of the invention but does not limit its scope.

EXAMPLE 1

The example refers to the process schematized in FIG. 1. Charge (1)—Petroleum residue:

T=15° C.; P=1 Atm; Flow rate=99.56 kg/h

| | |
|---|---|
| C | 83.94% by weight |
| H | 7.82% by weight |
| N | 1.26% by weight |
| S | 3.91% by weight |
| O | 2.82% by weight |
| ash | 0.25% by weight |

Catalyst (2): KOH

T=15° C.; Flow rate=0.496 kg/h
Stream (3): Flow rate=108.17 Kg/h
Stream (4): Flow rate=405.72 Kg/h
Stream (5): Flow rate=52.02 Kg/h; T=500° C.
Streams ($f_1+f_2+\ldots+f_n$): Flow rate=32.99 kg/h

| | |
|---|---|
| C | 80.43% by weight |
| H | 8.94% by weight |
| N | 1.18% by weight |
| S | 3.97% by weight |
| O | 5.48% by weight |

Stream (6):Air Flow rate=117.53 Kg/h; T=486° C.; P=25 Atm
Stream (7): Vapour Flow rate=100 Kg/h; T=333° C.; P=25 Atm
Stream (8): Flow rate=264.79 Kg/h; T=650° C.; P=25 Atm
Stream (9): Flow rate=8.106 kg/h
Stream (10): Flow rate=0.787 kg/h
Stream (11): Flow rate=349.56 kg/h; T=650° C.; P=25 Atm
Stream (12): Flow rate=19.03 kg/h; P=1 Atm
Stream (14): Higher heating power=8.87 MJ/Nm$^3$

| | |
|---|---|
| CO | 2.59% in Vol |
| $CO_2$ | 19.40% in Vol |
| $H_2$ | 16.15% in Vol |
| $CH_4$ | 10.7% in Vol |
| $C_2H_4$ | 0.96% in Vol |
| $C_2H_6$ | 0.8% in Vol |
| $C_3H_8$ | 0.86% in Vol |
| $C_4H_{10}$ | 0.15% in Vol |
| $NH_3$ | 0.06% in Vol |
| $H_2S$ | 0.03% in Vol |
| $N_2$ | 28.00% in Vol |
| $H_2O$ | 20.30% in Vol |

Stream (15): Capacity=0.306 MW; $\eta$=43.4% (efficiency referring to net chemical energy at inlet in terms of higher heating power)

We claim:

1. Process for the conversion of a hydrocarbon material, having a high molecular weight, comprising the following steps:

impregnating or mixing the hydrocarbon material, with a catalyst selected from the group consisting of an alkaline compound, an earth-alkaline compound and a mixture thereof; wherein the alkaline or earth-alkaline ion or ions are present in a quantity of between 4 and 20% by weight with respect to the hydrocarbon material;

pyrolyzing the impregnated residue in a suitable zone at a temperature of between 450° and 650° C. and at a pressure of less than 25 Atms, obtaining a gaseous stream containing hydrocarbons and a solid stream consisting essentially of coke impregnated with the catalyst;

gasifying the solid stream leaving the pyrolysis step in a single step with water vapour and in the presence of air in a ratio of between 10 and 100% and between 10 and 60% by weight respectively with the charge fed to the gasification section, operating at a temperature of between 600° and 850° C. and at a pressure of between 1 and 25 Atms to generate a gaseous stream consisting essentially of a fuel gas with a low to medium heating power and a solid stream to be recycled, at least in part, to the pyrolysis step;

condensing and separating the hydrocarbons contained in the gaseous stream obtained in the pyrolysis step obtaining one liquid stream and one gas stream;

mixing the latter gas stream with the gaseous stream obtained in the gasification step and feeding the stream thus obtained to a plant for the production of thermal or electric energy.

2. Process according to claim 1 wherein at least 70% by weight of the solid stream leaving the gasification step is recycled to the pyrolysis step.

3. Process according to claim 1 wherein the gasification is carried out at temperatures of between 600° and 700° C. and at a pressure of between 20 and 25 Atms.

4. Process according to claim 1 wherein the pyrolysis is carried out at temperatures of between 450° and 550° C. and at pressures of between 1 and 1.5 Atms.

5. Process according to claim 1 wherein in the gasification step the vapour ratio of the charge is between 20 and 60% by weight and the air ratio of the charge is between 20 and 60% by weight.

6. Process according to claim 1 wherein the gas obtained is fed to the plant for the production of electric energy consisting of a combined cycle with gas turbine and vapour turbine.

7. Process according to claim 1 wherein the hydrocarbon materials are petroleum residues or heavy crude oils or reduced crude oils.

8. Process according to claim 7 wherein the petroleum residues are those obtained from a deasphaltation process of a petroleum distillation residue.

9. Process according to claim 7 wherein the petroleum residues are those obtained from a visbreaking process.

10. Process according to claim 1 wherein the temperature of the gases leaving the gasification section is less than 600° C.

* * * * *